May 10, 1966 D. E. GENSHEIMER ETAL 3,250,784
PYRROLIDONYL-γ-BUTYRAMIDE AND PROCESS OF PREPARING
Filed Dec. 23, 1963
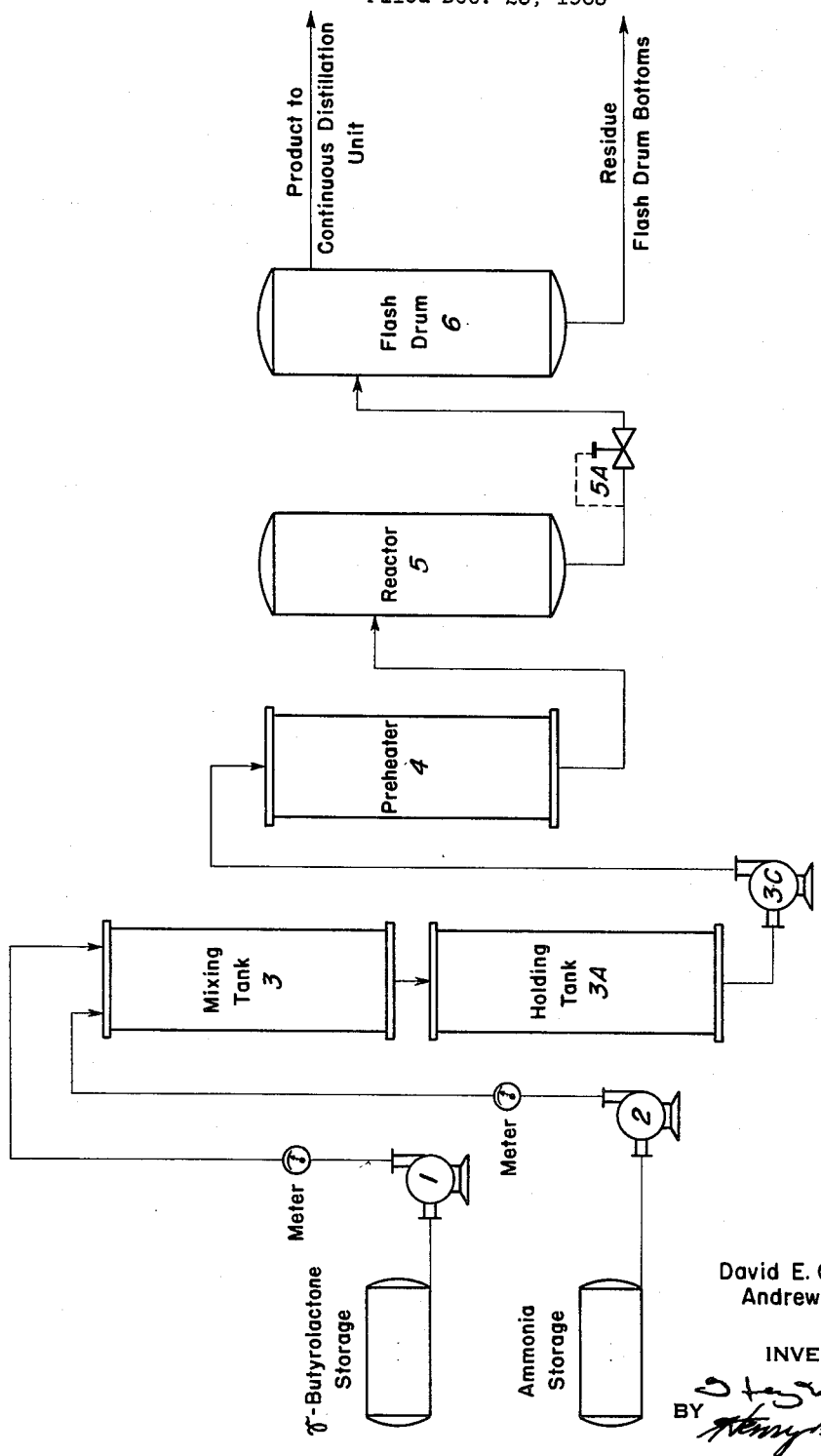
David E. Gensheimer
Andrew S. Wood
INVENTORS
BY
ATTORNEYS

3,250,784
PYRROLIDONYL-γ-BUTYRAMIDE AND PROCESS OF PREPARING

David E. Gensheimer and Andrew S. Wood, Paducah, Ky., assignors to General Aniline & Film Corporation, New York, N.Y., a corporation of Delaware
Filed Dec. 23, 1963, Ser. No. 332,785
2 Claims. (Cl. 260—326.3)

This invention relates to new chemical compounds, pyrrolidonyl-γ-butyramide and the hydrolysis products thereof, having several new uses as such and as new intermediates in the synthesis of a new and useful class of chemical products, and to the process of preparing the same.

It is known that γ-butyrolactam, commonly referred to as 2-pyrrolidone, can be prepared in the batch or continuous process by the reaction of γ-butyrolactone with anhydrous liquid ammonia under pressure, followed by vacuum distillation of the crude reaction product. In both processes, the reaction entails, (a) the cleavage of the lactone ring, (b) the formation of γ-hydroxybutyramide, and (c) ring closure of the γ-hydroxybutyramide with the elimination of water to yield 2-pyrrolidone.

The continuous process of preparing 2-pyrrolidone, as previously operated, can best be described by reference to the flow sheet of the accompanying drawing. It consists of metering by means of pumps 1 and 2, γ-butyrolactone and anhydrous liquid ammonia in the molar ratio of 1:1.1 to 1:1.5 at ambient temperature and ammonia pressure of from 1600 to 2300 lbs./sq. in. into preheater 4 wherein the mixture is heated to a temperature ranging from 140° to 220 C. by means of steam maintained at a pressure of 35 to 450 lbs./sq. in. and wherein the cleavage of the lactone ring and formation of the γ-hydroxybutyramide take place. The heated liquid mixture is then passed to a coil reactor 5 which is maintained at a temperature ranging from 250°–300° C. and wherein the pressure ranging from 1600 to 2300 lbs./sq. in. is regulated by valve 5A. In reactor 5 the γ-hydroxybutyramide ring closes to 2-pyrrolidone with elimination of water. The reaction mixture is then passed continuously to flash drum 6 which is maintained at a temperature of from 200–275° C. and a pressure of 40 to 300 mm. (mercury gauge) wherein a tarry residue settles to the bottom and the overhead vapor proceeds to a continuous distillation unit where it is degassed and fractionated by distillation. The fractionation separates the 2-pyrrolidone and all of the lighter boiling impurities from the overhead. The flash drum residue, which amounts to about 10% of the charge, consists of a black, tarry mixture containing from about 20–40% of 2-pyrrolidone and from about 60–80% of a resinous material.

In our constant surveillance of the foregoing process to improve the capacity of one or more of the operating units as well as the yield of 2-pyrrolidone, we have, from time to time, made several changes in the equipment and mode of operation. One recent change consisted of installing mixing tank 3, holding tank 3A and a pump 3C between pumps 1 and 2 and preheater 4. Mixing tank 3 and holding tank 3A were internally heated by means of circulating water and maintained at a temperature of 50° to 100° C. and a pressure of 15 to 600 lbs./sq. in. The purpose of mixing tank 3 was to facilitate the cleavage of the γ-butyrolactone and formation of γ-hydroxybutyramide. The purpose of holding tank 3A was to ensure that the temperature of the crude reaction mixture remains within the range of 50° to 100° C. for a period of at least 2½ hours, preferably from 3 to 8 hours, before passing through pumps 3C to preheater 4. The holding tank 3A also ensured a homogenous and continuous feed supply to pump 3C which then fed the crude reaction mixture to preheater 4 at a pressure of from 1600 to 2300 lbs./sq. in. Putting all units into operation as before with the additional components, i.e., mixing tank 3, holding tank 3A and pump 3C, we observed that the residue, flash drum bottoms, was about 125% of the amount previously formed. Instead of a black, tarry mixture, a thick, greenish-brown oil was obtained. The resulting oil contained 10–20% of 2-pyrrolidone, 20–40% of resinous material as before, and in addition 40–70% of a light-brownish substance which was identified, as will be shown hereinafter, as pyrrolidonyl-γ-butyramide. The 2-pyrrolidone and the resinous material were separated from the oil by extraction with acetone leaving, as the residue, crude, light-brownish pyrrolidonyl-γ-butyramide.

We do not know, at the present time, in which of the operating units the pyrrolidonyl-γ-butyramide is formed. Nevertheless, the fact remains that by the above modification both the character and quantity of the flash drum residue were changed in an unexpected manner.

The pyrrolidonyl-γ-butyramide is isolated in the crude state by first leaching the residue (flash drum bottoms) with about 50 volume percent of a non-solvent such as ether, dioxane, ethyl acetate, benzene, acetone or n-heptane. The leaching is simply accomplished by slurrying one part by weight of the residue with 1 to 4 parts by weight or volume of the leaching solvent. During the leaching operation soluble by-product materials such as 2-pyrrolidone and resinous material containing, inter alia, γ-butyrolactone and γ-hydroxybutyramide are removed. The slurrying may be conducted at room temperature or slightly above with stirring for a period of time ranging from 2 to 15 minutes. The slurry is filtered and then dried either at room temperature, water bath, hot plate or in a vacuum, i.e. at 60° C. and 100 mm. of mercury pressure to an off-white crude pyrrolidonyl-γ-butyramide having a melting point of 94°–97° C. Pyrrolidonyl-γ-butyramide of higher purity may be obtained by employing high speed agitation during the slurrying operation.

To obtain the pyrrolidonyl-γ-butyramide in a purer state, the crude product is dissolved in either hot ethyl acetate, benzene, acetone or dioxane and the hot solution treated with decolorizing carbon, then filtered and allowed to cool. During cooling, crystals of substantially pure pyrrolidonyl-γ-butyramide are obtained. The pure product either precipitates immediately or crystallizes on standing. The amount of crystallizing solvent employed may be in the range of 100 parts by weight for each 4–5 parts by weight of the crude product. After crystallization is complete, the crystallizing solvent is filtered off by any conventional means and the crystals dried under vacuum at 60° C. and 100 mm. of mercury pressure. As an alternative, the crude product may be dissolved in hot chloroform and the hot solution treated with decolorizing carbon and filtered. To the filtrate is added commercial heptane to the cloud point and the solution allowed to cool slowly, whereupon the substantially pure product crystallizes on standing. The crystals are isolated by filtration and then dried under vacuum at 60° C. and 100 mm. of mercury pressure. In the alternative procedure, 50 parts by weight of the crude are used for each 100 parts by weight of chloroform.

Two recrystallizations from ethyl acetate followed by one recrystallization from chloroform/heptane are sufficient to yield a product of 100% purity.

The following examples will show how the pyrrolidonyl-γ-butyramide is obtained, the proof of its structure and its utility as such and the several new chemical intermediates prepared therefrom and their uses.

Example 1

A 270 gram sample of the thick, greenish-brown oil taken from the flash drum bottoms was slurried with 600 ccs. of acetone for 10 minutes at room temperature and then filtered. About 100 grams of an off-white, moist powder were obtained. The powder was gently heated in a glass vessel on a steam bath to remove the residual acetone. The resulting dried material was recrystallized twice from hot ethyl acetate (solubility in hot ethyl acetate ca. 4–5 grams/100) following treatment with decolorizing carbon, filtering and cooling. On further recrystallization from chloroform (solubility hot ca. 50 grams/100) with addition of commercial heptane to the cloud point followed by slow cooling, pure crystals were obtained by filtration which were then dried under vacuum at 60° C. and 100 mm. of mercury pressure.

The physical characteristics of the pure crystals were determined with the following results:

Molecular weight: 170.21.
Melting point: 99.8°–100.5° C.
Crystalline form: Colorless triclinic prisms with two opposing truncated corners.
Solubility:
Soluble in water, lower alcohols, i.e. methanol, ethanol, propanol and butanol, acetic acid, dimethyl formamide and chloroform.
Insoluble in ether, dioxane, ethyl acetate, benzene, acetone and heptane.

Upon elemental analysis of the crystals, the following data were obtained:
Calculated for $C_8H_{14}N_2O_2$: C, 56.45; H, 8.29; N, 16.46.
Found: C, 56.91; H, 8.11; N, 16.38.

The postulated structure:

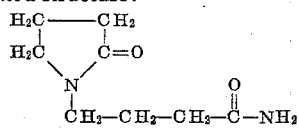

based on elemental analysis and the molecular weight of the product, was confirmed by infra-red and nuclear magnetic resonance spectra studies. The infra-red spectra, obtained with a Perkin Elmer 221 and 421 (expanded), had several distinct adsorptions:

At 3150–3200 cm.$^{-1}$ there was an indication of —N—H stretching. At 2900–2950 cm.$^{-1}$ there was an indication of C—H stretching, and at 1600 cm.$^{-1}$ and 1675 cm.$^{-1}$ the presence of primary amide and lactam carbonyl in solid state, respectively. At 1410 cm.$^{-1}$ 1420 cm.$^{-1}$ there was an indication of the primary amide, carbon-nitrogen linkage (R—CO—NH$_2$).

An integrated nuclear magnetic resonance spectrum (A–60 with deuterochloroform, CDCl$_3$, as solvent) showed the following types of protons, peaks and number of protons:

| Type of Protons | Peaks | No. of Protons |
|---|---|---|
| O=C—N | Two singlets (cis. and trans due to hindered rotation about C—N bond). | 2 |
| (ring CH$_2$ adjacent to N) | Triplet | 2 |
| N—C— | Triplet | 2 |
| N—C—C—C—C—N | Complex (Very close resonating fields). | 8 |
| Total | | 14 |

In the light of the foregoing information, the pyrrolidonyl-γ-butyramide can be synthesized by the oxidation of the reaction product of one equivalent weight of γ-butyrolactone with one equivalent weight of n-butanolamine. The resulting acid is then converted to its acid chloride and treated with ammonia. It can also be synthesized by treatment of N-hydroxypropyl-2-pyrrolidone with phosphorous trichloride to the N-(3-chloropropyl)-2-pyrrolidone followed by treatment with KCN and hydrolysis to pyrrolidonyl-γ-butyric acid. The latter when converted to the acid chloride and treated with ammonia yields pyrrolidonyl-γ-butyramide.

The pyrrolidonyl-γ-butyramide was synthesized by the following alternate procedure:

*Example 1A*

To a 1-liter flask equipped with reflux condenser, stirrer and dropping funnel there were added 400 ml. of toluene and 23 grams (1 mole) of sodium. The contents were heated to boiling with rapid agitation, and 85 grams (1 mole) of 2-pyrrolidone added dropwise over a period of an hour. To the resulting slurry there were added 122 grams (1 mole) of γ-chlorobutyramide and reflux continued for four hours. The reaction mixture was cooled to about 50° C., diluted with 300 ml. of chloroform and filtered at 50° C. to remove solids. The filtrate was treated with decolorizing carbon, filtered and the bulk of the chloroform removed on a steam bath. After cooling to 10° C. the product, pyrrolidonyl-γ-butyramide, was recovered by filtration followed by drying at 60° C. and 200 mm. of mercury pressure. The yield is about 140 grams or 82% of theory.

The pyrrolidonyl-γ-butyramide forms several metallic salts such as sodium, silver, magnesium, mercury, zinc, etc. The silver pyrrolidonyl-γ-butyramide reacts with alkyl iodides to give imino ethers. Hydrolysis of the pyrrolidonyl-γ-butyramide to the corresponding acid may be brought about by treatment of the amide with nitrous acid. By heating one equivalent of the pyrrolidonyl-γ-butyramide with one equivalent of a mineral acid or alkali metal hydroxide to the boil until the evolution of ammonia ceases, pyrrolidonyl-γ-butyric acid is obtained. However, by employing more than 2 equivalents of a mineral acid or alkali metal hydroxide under reflux followed by neutralization with a base to a pH of 3.5 γ,γ'-aminodibutyric acid is obtained.

The diacid can be converted to a diamide by ammonolysis. The esters of the diacid can be subjected to ammonolysis with either aqueous or alcoholic ammonia at room temperature or at 0°–5° C.

The esters of the mono-acid and of the di-acid react with hydrazine under reflux to form the corresponding hydrazides. The esters of the mono- and the di-acids are readily reducible to the corresponding alcohols. The acids, i.e., mono- and di-, can be readily halogenated to give the corresponding halo acids.

By reduction of the ester of pyrrolidonyl-γ-butyric acid with sodium in alcohol, a primary alcohol is formed, i.e. N-(4-hydroxybutyl)-2-pyrrolidone. The resulting alcohol reacts with thionyl chloride to yield the corresponding halide which may be used in the reaction with sodium or potassium hydrosulfide to yield a primary mercaptan. Upon oxidation of the latter with hydrogen peroxide or sodium hypohalite a disulfide is formed from which the mercaptan is regenerated by reduction, i.e. zinc dust and acid. The alcohol also reacts with triphenyl phosphite and chlorine to yield the corresponding chloride. The alcohol can be treated with ammonia in the presence of zinc chloride to yield a mixture of primary, secondary and tertiary amines.

Treatment of the amide with a dehydrating agent such as phosphorous pentoxide or thionyl chloride yields pyrrolidonyl-γ-butyronitrile which by reduction with sodium and alcohol yields a primary amine. The same amine can be obtained by catalytic reduction of the nitrile with hydrogen in the presence of nickel, platinum or palladium catalyst. The amide undergoes the Hoffmann reaction, i.e. treatment with sodium hypochlorite or hypobromite to yield a primary amine of one less carbon atom. The resulting amine also undergoes the Hoffmann degradation to yield the corresponding alkene derivative. Condensation of the amine with phosgene yields the carbamyl chloride from which the isocyanate, RN=C=O, is obtained by dehydrochlorination. The amine reacts with acetyl chloride or benzoyl chloride to yield the corresponding acetyl propylamine or benzoyl propylamine, respectively.

The amide of Example 1, 1A and the amides prepared from the products of Examples 3, 6, 7 and 9 are useful as antistatic agents in photographic film. They may be applied as a 1-2% solution in methanol, gelatin or the usual synthetic resins to a sub-layer, as a coating over the sub-layer, to the finished film either on the obverse surface, reverse surface or to the light-sensitive emulsion, or to either surface of the exposed and processed film. They are also useful as anti-static agents for nylon, orlon, Dacron and Acrilan. When added to an exhausted photographic bleach solution, comprising an alkali ferricyanide and an alkali bromide, the bromoamides regenerate or rejuvenate such solution.

The above amides are useful as fog inhibitors in silver halide emulsions.

The above amides as well as the acids of Examples 2 and 6 when incorporated with a salt of a polybasic acid ester of the leuco form of vat dyestuff yields an improved textile printing composition wherein the solubility of the dyestuff in the print paste is improved yielding superior print paste stability and improved tinctorial quality of the textile prints.

The above amides and the amine of Example 5 readily form complexes with halide salts of copper, gold, silver, tellurium, platinum, etc. and the complexes employed in the plating of copper, bronze, brass, stainless steel, etc., without the need of an electric current. For example, with a silver halide, the complex is prepared by gently heating an equivalent weight of the amide or amine with an equivalent amount of silver halide (chloride, bromide or iodide) until a solution is formed. To the solution is added gradually one equivalent weight of either hydrobromic or hydroiodic acid and the resulting solution diluted with a four fold volume of any liquid organic primary or secondary amine. A strip of clean copper metal placed into the resulting solution yields a bright and shiny silver coating within a few seconds.

The following examples will show how some of the foregoing reactions may be effectuated and the use to which the reaction products may be put:

*Example 2*

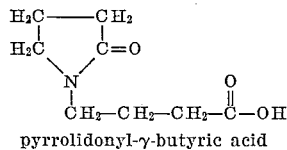

pyrrolidonyl-γ-butyric acid

In preparing the above acid, it is essential that one equivalent weight of the pyrrolidonyl-γ-butyramide be used with one equivalent weight of an alkali metal hydroxide or a mineral acid.

To 85 grams (0.5 mole) of crude pyrrolidonyl-γ-butyramide there were added 28 grams (0.5 mole) of potassium hydroxide in 252 grams of distilled water. The solution was boiled for 2 hours until the evolution of the ammonia ceased, about 1½-2 hours. The resulting aqueous solution was neutralized to pH 7 with concentrated hydrochloric acid, extracted with six 75 ml. portions of hot chloroform, the chloroform solution decolorized with charcoal, filtered and the filtrate dried with anhydrous calcium sulfate to absorb the small amount of water present in the chloroform solution. The solution was then filtered and the filtrate placed on a hot plate in the hood to vaporize the chloroform. In lieu of the latter procedure the dry chloroform solution may be subjected to distillation to remove the chloroform. There were obtained 64 grams of product which was recrystallized from hot benzene.

The physical characteristics of the recrystallized product, after removal of all traces of benzene, were determined with the following results:

Melting point: 89.0°-89.5° C.
Crystalline form: White spars in clusters
Solubility:
  Soluble in water, lower alcohols, i.e. methanol, ethanol, propanol and butanol, acetic acid, dimethyl formamide dioxane, acetone and chloroform
  Insoluble in ether, ethyl acetate, benzene, and heptane
Neutralization equivalent: Calculated—171.2. Found —172.1.

The acid, as well as the acids of Examples 3, 6, 7 and 9, can be converted directly to a primary amine by treatment with ammonia in the presence of sulfuric acid in accordance with the procedure described by Wolf, Organic Reactions, vol. 3 page 307.

The acid is readily esterified with aliphatic, aromatic and heterocyclic alcohols to yield a new class of esters useful as plasticizers for synthetic resins. An ester containing 2 terminal pyrrolidonyl groups is readily obtained by esterifying the acid with N-hydroxyethyl-2-pyrrolidone.

The acid is readily subjected to the Hell-Vollhardt-Zelinsky reaction to yield pyrrolidonyl-γ-(bromobutyric acid). The bromine atom in the alpha position to the carboxyl group is readily replaced by NH₂ and CN by treatment with ammonia and potassium cyanide, respectively. The hydroxy acid and the amino acid are valuable intermediates in the syntheses of new products.

*Example 3*

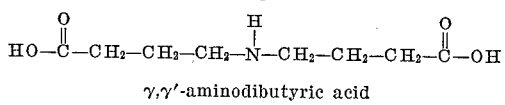

γ,γ'-aminodibutyric acid

In preparing the above di-acid, 2 equivalent weights of either an alkali metal hydroxide or mineral acid are used for each equivalent weight of pyrrolidonyl-γ-butyramide. An excess of either alkali or acid is preferred from the standpoint of yield.

To 160 grams of crude pyrrolidonyl-γ-butyramide in a 2-liter flask there were added 347 grams of concentrated hydrochloric acid and the resulting slurry refluxed for 24 hours. The solution was cooled to room temperature and neutralized with 50% aqueous sodium hydroxide to pH 3.5 whereupon the di-acid precipitated. The precipitate was recovered by filtration and recrystallized from hot water after treatment with decolorizing carbon. The crystals were dried under vacuum at 60° C. and 100 mm. of mercury pressure.

The physical characteristics of the crystals were determined with the following results:

Molecular weight:
  189.21.
Melting point:
  186.5°-187° C. with decomposition at slow heating.
  189° C. with decomposition at fast heating.
Crystalline form: White, rectangular plates.
Solubility:
  Soluble in hot water, hot acetic acid, 1.5 N sodium bicarbonate and 1.2 N hydrochloric acid.
  Insoluble in ether, alcohol, dimethyl formamide, dioxane, ethyl acetate, benzene and acetone.

Upon elemental analysis of the crystals the following data were obtained:

Calculated for: $C_8H_{15}NO_4$; C, 50.78; H, 7.99; N, 7.40.
Found: C, 50.70; H, 8.05; N, 7.5.

The di-acid ring closes with the loss of water at its melting point to pyrrolidonyl-γ-butyric acid. In view of its propensity to ring close, the di-acid has a greater percentage of the acid in the Zwitter-ion form. In spite of the existence of the Zwitter-ion, the amino group of the di-acid is readily capable of undergoing acylation and alkylation reactions, especially in the presence of a tertiary amine which increases the equilibrium concentration of the free amino group and speeds up the reaction. The di-acid is, therefore, unique as contrasted with its next lower homologue, β,β'-iminodipropionic acid and its position isomer, 2,2'-iminodibutyric acid, both of which are incapable of ring closure at their respective melting points.

By acetylating the amino group of the di-acid as in Example 9, the acetylated product dehydrates below its melting point to give a long chain anhydride which reacts with many compounds having an active hydrogen to yield a variety of new and useful products.

The di-acid is readily converted to its di-chloride by treatment with phosphorous trichloride. The di-acid readily forms di-esters with alcohols. When the di-chloride or the di-ester is subjected to the action of ammonia, a diamide is obtained. When the latter is heated, it loses ammonia and forms the cyclic imide:

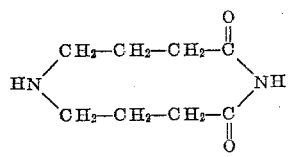

The di-esters of the di-acid with lower alcohols such as methanol or ethanol can be reduced to primary alcohols by the actions of sodium and alcohol or by sodium and moist ether. The resulting di-alcohol can be esterified with the di-acid to yield a new type of polyester containing amido and amino groups in its polyester chain. The polyester, from the hot melt, can be spun into filaments or cast into sheets and films.

Treatment of the diethyl ester of the di-acid with urea in the presence of sodium ethylate as catalyst yields:

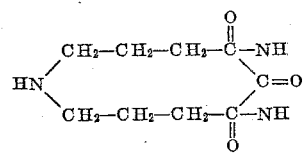

*Example 4*

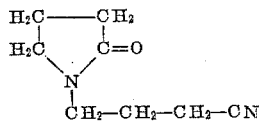

pyrrolidonyl-γ-butyronitrile

Into a 500 ml. flask equipped with reflux condenser and drying tube there were added 8.5 grams (0.05 mole) of pyrrolidonyl-γ-butyramide, 24 grams (0.2 mole) of thionyl chloride and 100 cc. of benzene and the mixture refluxed for 16 hours. At the end of this period, the benzene and thionyl chloride were distilled off leaving a residue consisting of 6.3 grams of pyrrolidonyl-γ-butyronitrile and 0.8 gram of unchanged pyrrolidonyl-γ-butyramide. The nitrile was isolated from the residue by extraction with cold benzene, decolorization with activated carbon and solvent removal.

The resulting nitrile is readily reduced to a primary amine. The ammonolysis of the nitrile is readily accomplished by heating it with sodamide followed by the hydrolysis of the sodium salt of the amidine. The resulting amidine forms salts with mineral acids which are stable in water.

Alcoholysis of the nitrile with methanol and hydrochloric acid yields the corresponding imido ester hydrochloride.

The nitrile is useful in the control and eradication of fungi attacking chlorophyllacious plants.

*Example 5*

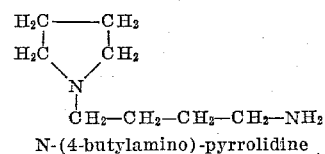

N-(4-butylamino)-pyrrolidine 100 grams of pyrrolidonyl-γ-butyramide in 500 ml. of anhydrous ethanol were contacted with pulverized copper chromite at 3450 p.s.i.g. hydrogen pressure and a temperature of 255° C. in a stirred autoclave. After the theoretical amount of hydrogen was consumed the product was recovered by removal of the catalyst by filtration followed by distillation of the ethanol.

The resulting amine is useful as an accelerator for photographic developers. In an amount ranging from about 1 to 8 grams per liter of developer solution, black and white and color, the amine accelerates the development so as to cause the developing agent to form the image (silver or color image) more rapidly than is possible without the presence of such amine.

The resulting amine when treated with one equivalent amount of hydrobromic acid yields the corresponding bromoamine which is also useful as a regenerating or rejuvenating agent for exhausted photographic bleach solutions, i.e., those comprising an alkali ferricyanide and an alkali bromide.

The amine reacts readily with (1) alkali metal cyanates and with (2) acrylonitrile to yield compounds of the type:

(1)

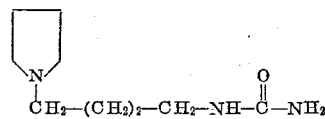

(2)

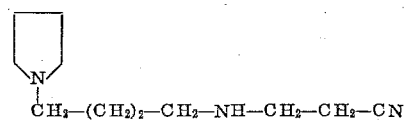

With these compounds, the presence of the amino and imino group offers a possibility of further reactions, such as acylation and alkylation.

The amine also reacts with anhydrides of dicarboxylic acids to yield diacyl imido butyl derivatives,

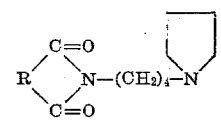

which on saponifaction yield amido acids of the type:

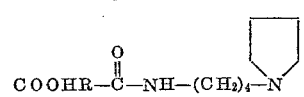

*Example 6*

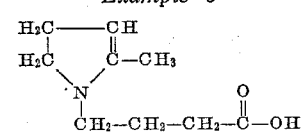

N-(3-carboxypropyl)-2-methylpyrroline-2

Into a 500 ml. round bottom flask equipped with reflux condenser, drying tube and dropping funnel were added 24 grams of methyl magnesium bromide in 150 ml. of anhydrous ethyl ether followed by the slow addition from the dropping funnel of a suspension of 34 grams of pyrrolidonyl-γ-butyric acid in 150 ml. of ether. After the addition was complete, the mixture was refluxed for 4 hours. There were then added 50 grams of water with agitation and the ether removed by distillation. The remaining residue in water was refluxed for 1 hour and then slowly cooled. On cooling, 15 grams of the product precipitated out and was isolated by filtration. It was then recrystallized from hot water.

*Example 7*

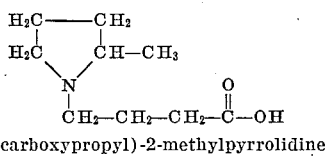

N-(3-carboxypropyl)-2-methylpyrrolidine 15 grams of the product of Example 6 were dissolved in ethanol and contacted with 1 gram of 5% palladium on carbon as a catalyst at 60 p.s.i.g. hydrogen pressure and 70° C. in a stirred autoclave. After consumption of the theoretical amount of hydrogen, the suspension was filtered to remove the catalyst. 14 grams of the product were recovered by removal of the ethanol.

*Example 8*

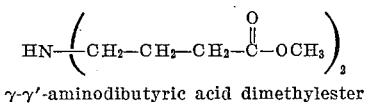

γ-γ'-aminodibutyric acid dimethylester 19 grams (0.1 mole) of the diacid of Example 3 were refluxed with 119 grams (1 mole) of thionyl chloride for 6 hours. The excess thionyl chloride was removed by distillation. The remaining residue was then slurried with 100 ml. of benzene and 9.6 grams (50 mole percent excess) of methanol added with rapid agitation. The dimethyl ester precipitated out as the amine hydrochloride. The free dimethyl ester was isolated by neutralizing the filtered amine hydrochloride with 10% aqueous sodium hydroxide to pH 9, followed by extraction with chloroform and removal of the solvent.

*Example 9*

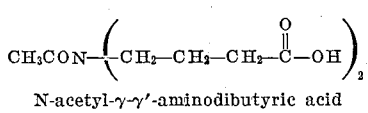

N-acetyl-γ-γ'-aminodibutyric acid 18.8 grams (0.1 mole) of γ,γ'-aminodibutyric acid were refluxed with 22.4 grams (0.3 mole) of acetyl chloride and 7.9 grams of pyridine for 4 hours. The excess acetyl chloride was stripped off and benzene added to the residue. The residue was then washed with distilled water, dried with anhydrous calcium sulfate, filtered and the filtrate decolorized with activated carbon. There were recovered 17.5 grams of product by removal of the benzene.

The acetylated product dehydrates below its melting point.

*Example 10*

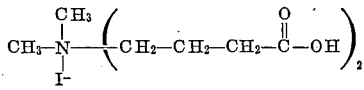

Di-(3-carboxypropyl)-dimethyl ammonium iodide

To 5 grams of γ,γ'-aminodibutyric acid in a 50 ml. flask equipped with reflux condenser there were added 10 ml. of ethanol, 3.8 grams of methyl iodide and 2.1 grams of pyridine. After refluxing for 2 days the excess methyl iodide was removed. At this point the N-methyl-γ,γ'-aminodibutyric acid may be isolated if desired. An additional 10 grams of methyl iodide were added and the refluxing continued for an additional 24 hours. The excess methyl iodide was removed, benzene added to the residue and the product recovered by filtration. The resulting product is useful as an insecticide for chewing and sucking insects.

*Example 11*

To 47 grams (0.25 mole) of γ,γ'-aminodibutyric acid and 1% of p-toluene sulfonic acid in a 200 ml. flask equipped with a water trap there were added 88 grams (1 mole) of 1,4-butanediol. The flask was purged with nitrogen and a slow nitrogen stream maintained. The reactants were heated to 100°–200° C. until the theoretical amount of water was removed. The excess 1,4-butanediol was removed by distillation under high vacuum leaving a glassy polyester. The resulting polyester may be spun into filaments or cast into sheets and films. An equal mixture of the resulting polyester with polyethylene terephthalate in melt form, when spun into filaments and the filaments fabricated into a fabric, gives a fabric possessing silk-like softness.

Polyester as obtained above may be cross-linked in the molten mass with 1–10% by weight of adipic acid, γ,γ'-aminodibutyric acid or other conventional dicarboxylic acids while heating at 100°–200° C. until no more water is formed.

*Example 12*

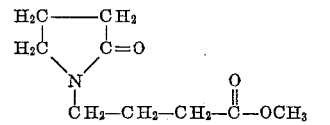

Pyrrolidonyl-γ-butyric acid methyl ester

To an ether suspension of 85.6 grams (0.5 mole) of pyrrolidonyl-γ-butyric acid there was added in portions, at room temperature, an ethereal solution containing 21 grams (0.5 mole) of diazomethane. When the evolution of nitrogen ceased and the yellow color discharged, the ethereal solution was warmed on a steam bath to dryness to yield 92 grams of the methyl ester.

The ester is useful as a stabilizer or fog inhibiting agent for silver halide emulsions.

*Example 13*

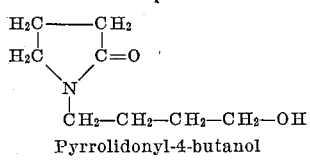

Pyrrolidonyl-4-butanol

Forty-six grams (0.25 mole) of the methyl ester of Example 12 were refluxed with 92 grams (2 moles) of anhydrous ethanol and 46 grams (2 moles) of sodium for 1 hour. The reaction mixture was allowed to cool to room temperature and 40 ml. of water in 1 liter of ethanol carefully added to hydrolyze the sodium ethoxide to ethanol and sodium hydroxide. The oily layer was separated from the aqueous layer, washed with dilute hydrochloric acid, followed by washing several times with water, and distillation.

The alcohol may be employed in baths for the bleaching of the silver image in a multicolor film following color-forming development. The concentration of the alcohol required may vary considerably. For instance as little as 5 grams per liter of bleach effects complete conversion of metallic silver into a silver salt soluble in the usual silver-salt solvent, and as much as 20 grams per liter can be used without interference with the properties of the bleaching solution.

The alcohol is also useful in the final aqueous rinse bath, about 2–5% solution, for developed color photographs as an anti-staining agent, i.e. for inhibiting the color decomposition of azo, azine, azomethine, indophenol, and quinonimine dyes present in color photographic emulsions.

The alcohol may be esterified with cyanoacetic acid and the resulting ester condensed in alcohol and small amount of piperidine with either 4-diethyl-aminobenzaldehyde or N-ethyl-β-(4-formylphenyl)-aminoethyl propionate under reflux to yield fluorescent methine dyes for dyeing acetate rayon, polyesters and other fibers.

Treatment of the alcohol with thionyl chloride yields the chlorobutyl derivative which is useful for the introduction of a pyrrolidone group in alkylation reactions.

The products of Examples 1 and 5 are of particular utility in the decolorization of petroleum hydrocarbons such as crude kerosene, naphtha, paraffin oil and the like. The treatment merely involves the presence of any one of such compounds in colored liquid petroleum hydrocarbon and stirring or shaking the hydrocarbon mixture to establish contact and separating the immiscible portions by decantation and separation of the colored layer, which is always the bottom layer.

The acids of Examples 2, 3, 6, 7 and 9 and the dimethyl ester of Example 8 react with 2-amino- or 2-hydroxyalkane sulfonic acids and the alkali metal salts thereof, such as taurine, N-propyl taurine, isethionic and 2-hydroxy-2-butane-sulfonic acid, etc. to yield anionic surface active materials useful as wetting, cleansing, softening and dispersing agents.

The acids of Examples 2, 3, 6, 7 and 9; the amides of these acids, including the amide of Example 1; the amine of Example 5 and the alcohol of Example 13 when reacted in the conventional manner with 2 to 150 moles of ethylene oxide, propylene oxide, butylene oxide or mixtures thereof, yield polyalkylene ethers, esters and amides which are not only useful as surface active agents, but also useful as sensitizers or speed increasing agents in silver halide emulsions, black and white and color. When oxides higher than ethylene or mixtures of such higher oxides are used in the reaction, it is desirable that the reaction product be chain ended with at least one mole of ethylene oxide.

The acid chlorides of Examples 2 and 7 can be subjected to the Rosemund reduction reaction to yield aldehydes. R—CH$_2$—CH$_2$—CH$_2$—CHO, which are readily oxidized by heating with selenium dioxide to yield compounds of the type R—CH$_2$—CH$_2$—CO—CHO.

The aldehydes are useful as fixing agents in perfumes. They react with hydroxyl amine to an oxime and with semicarbazide to a semicarbazone.

While our isolation of the pyrrolidonyl-γ-butyramide has been described in connection with the continuous process of preparing 2-pyrrolidone, the same thick greenish-brown oil (contaning pyrrolidonyl-γ-butyramide) is obtained by the batch process provided that each of the operating units with our modification are maintained within the aforesaid range of temperatures and pressures.

In isolating the pyrrolidonyl-γ-butyramide from the flash drum bottoms during the leaching operation, any inert organic solvent may be employed in which the pyrrolidonyl-γ-butyramide is relatively insoluble at room temperature or slightly above.

It is to be noted that the character of the acidic and basic mediums employed in the hydrolysis of the pyrrolidonyl-γ-butyramide to the corresponding mono- or di-acid is immaterial so long as they are of sufficient strength to effectuate the hydrolysis. In lieu of the mediums mentioned heretofore, calcium hydroxide, barium hydroxide, trichloroacetic acid, p-toluene sulfonic acid, and the like, may be employed.

As regards the hydrolysis of the pyrrolidonyl-γ-butyramide to γ,γ'-aminodibutyric acid, higher yields are obtained, as previously noted, when more than 2 equivalents of either an acidic or basic material are employed per mole of the amide. We found that 4 equivalents per mole of said amide are sufficient to give the best yields.

We claim:
1. A chemical compound having the formula:

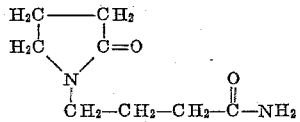

2. In the process of preparing 2-pyrrolidone which comprises heating a mixture of γ-butyrolactone and anhydrous liquid ammonia in the molar ratio of 1:1.1 to 1:1.5 maintained at a pressure of from 1600 to 2300 lbs./sq. in. at a temperature of from 140° to 220° C. to yield a mixture containing γ-hydroxybutyramide, heating said mixture at a temperature of from 250° to 300° C. while maintaining said pressure to yield a second mixture wherein the said γ-hydroxybutyramide has ring-closed to 2-pyrrolidone, passing said second mixture to a flash drum maintained at a temperature of from 200° to 275° C. and a pressure of from 40 to 300 mm. whereby a residue settles to the bottom and the overhead vapor proceeds to a distillation unit to recover the 2-pyrrolidone from said second mixture, the improvement which comprises preheating and maintaining said mixture of γ-butyrolactone and anhydrous liquid ammonia at a temperature of from 50° to 100° C. and a pressure of from 1600 to 2300 lbs./sq. in. for a period of at least 2½ hours before heating as above to 140° to 220° C., whereby said residue recovered from said flash drum is a thick greenish-brown oil containing pyrrolidonyl-γ-butyramide, treating said residue with an inert organic solvent wherein said pyrrolidonyl-γ-butyramide is relatively insoluble, and removing the resulting solution from undissolved pyrrolidonyl-γ-butyramide.

References Cited by the Examiner

UNITED STATES PATENTS

| | | | |
|---|---|---|---|
| 2,816,920 | 12/1957 | Anderson | 260—534 |
| 2,845,457 | 7/1958 | Kroll et al. | 260—534 |
| 3,030,380 | 4/1962 | Weygand et al. | 260—326.3 |
| 3,045,026 | 7/1962 | Eisenbraun | 260—326.3 |

OTHER REFERENCES

Noller, C. R., Chemistry of Organic Compounds, 1957, C. 5, page 246.

Reppe et al., Justus Liebigs Annalen der Chemie, Volume 596, 1955, page 199.

HENRY R. JILES, *Acting Primary Examiner.*

NICHOLAS S. RIZZO, *Examiner.*

J. TOVAR, J. A. NARCAVAGE, *Assistant Examiners.*